(12) United States Patent
Maruyama

(10) Patent No.: US 11,295,536 B2
(45) Date of Patent: Apr. 5, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Atsushi Maruyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/944,134

(22) Filed: Jul. 30, 2020

(65) Prior Publication Data

US 2021/0287452 A1    Sep. 16, 2021

(30) Foreign Application Priority Data

Mar. 10, 2020    (JP) .............................. JP2020-041123

(51) Int. Cl.
  *G06T 19/20*    (2011.01)
  *G06T 15/00*    (2011.01)
  *G06T 15/06*    (2011.01)

(52) U.S. Cl.
  CPC ............ *G06T 19/20* (2013.01); *G06T 15/005* (2013.01); *G06T 15/06* (2013.01)

(58) Field of Classification Search
  CPC ....... G06T 19/20; G06T 15/06; G06T 15/005; G06T 19/006
  See application file for complete search history.

(56) References Cited

U.S. PATENT DOCUMENTS

| 2012/0210254 A1 | 8/2012 | Fukuchi et al. | |
| 2015/0281887 A1* | 10/2015 | Johnson | ................ H04W 4/026 455/456.3 |
| 2016/0098862 A1* | 4/2016 | Wilson | ................ H04N 9/3185 345/419 |

FOREIGN PATENT DOCUMENTS

| JP | 2012168646 | 9/2012 |
| JP | 2017084100 | 5/2017 |

* cited by examiner

*Primary Examiner* — Said Broome
(74) *Attorney, Agent, or Firm* — JCIPRNET

(57) ABSTRACT

An information processing apparatus includes a processor. The processor is configured to set in three-dimensional space in which plural users are present, an intersection area that is an area in which fields of view of the plural users intersect as a shared area that is an area to be shared by the plural users.

13 Claims, 12 Drawing Sheets

| SHARED AREA ID | NUMBER OF VERTICES | COORDINATES OF VERTEX |
|---|---|---|
| R1 | n | $(Xr11, Yr11, Zr11)$ |
| | | ⋮ |
| | | $(Xr1n, Yr1n, Zr1n)$ |
| R2 | m | $(Xr21, Yr21, Zr21)$ |
| | | ⋮ |
| | | $(Xr2m, Yr2m, Zr2m)$ |
| ⋮ | ⋮ | |

| SHARED AREA ID | NUMBER OF VERTICES | COORDINATES OF VERTEX | USER ID |
|---|---|---|---|
| P1 | t | $(Xp11, Yp11, Zp11)$ | 000 |
| | | ⋮ | 001 |
| | | $(Xp1t, Yp1t, Zp1t)$ | 002 |
| ⋮ | ⋮ | | ⋮ |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-041123 filed Mar. 10, 2020.

BACKGROUND

(i) Technical Field

The present disclosure relates to an information processing apparatus and a non-transitory computer readable medium.

(ii) Related Art

A technique is available for virtually setting a shared area that is an area shared by a plurality of users in real space by using technologies, such as augmented reality (AR) and mixed reality (MR).

Japanese Unexamined Patent Application Publication No. 2012-168646 describes an apparatus that stores position data indicating the positions of virtual objects that are overlaid on real space and displayed on the screens of terminal apparatuses, sets a virtual shared area in real space, and permits or rejects display of each virtual object on the terminal apparatuses in accordance with whether the virtual object is positioned in the shared area.

Japanese Unexamined Patent Application Publication No. 2017-84100 describes an information communication terminal that obtains a captured image of real space, obtains a user-specific virtual object, detects an event related to information sharing from the captured image, and in a case where the event is detected at the same time when the event takes place in another terminal that is capturing an image of real space in a different direction and where the event indicates an instruction for starting sharing at a position specified in cooperation with the other terminal, superimposes and displays at the position in the captured image, a shared area in which sharing of the virtual object with the other terminal is allowed.

SUMMARY

As a method for virtually setting a shared area in three-dimensional space, a method in which a user specifies the coordinates of the shared area and a method in which a user specifies a real object are possible. However, in these methods, the user needs to specify the coordinates or the real object, which is troublesome.

Aspects of non-limiting embodiments of the present disclosure relate to providing a technique for setting a shared area in three-dimensional space easier than in a case where a user specifies coordinates or a real object for setting the shared area.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor. The processor is configured to set in three-dimensional space in which a plurality of users are present, an intersection area that is an area in which fields of view of the plurality of users intersect as a shared area that is an area to be shared by the plurality of users.

BRIEF DESCRIPTION OF THE DRAWINGS

An exemplary embodiment of the present disclosure will be described in detail based on the following figures, wherein.

DETAILED DESCRIPTION

Figure 1:
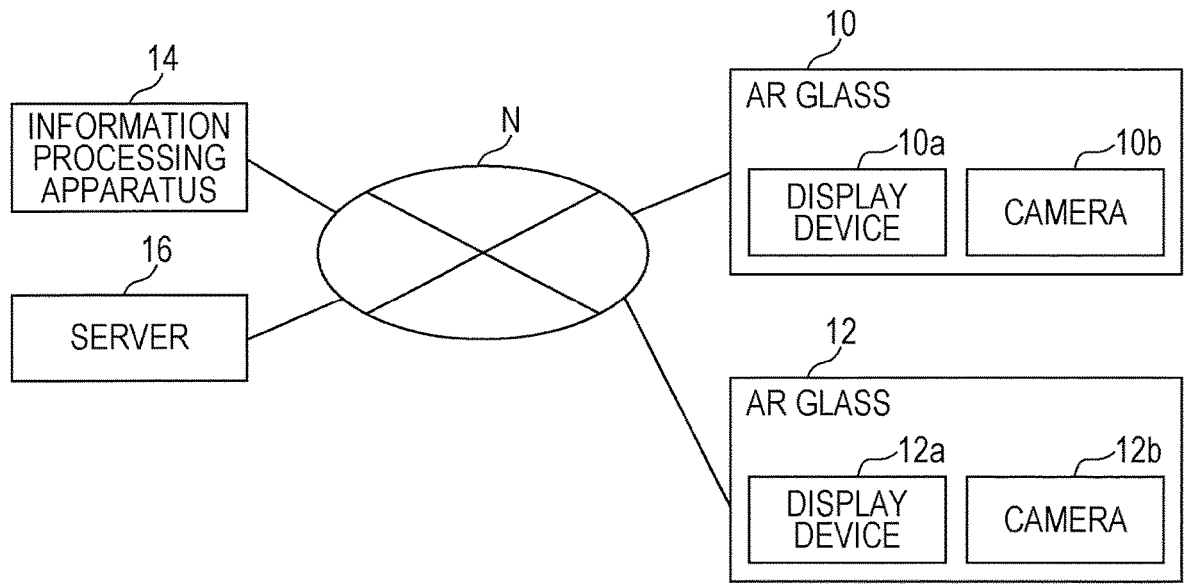
FIG. 1 is a block diagram illustrating a configuration of an information processing system according to this exemplary embodiment.

An information processing system according to this exemplary embodiment is described with reference to FIG. 1. FIG. 1 illustrates an example hardware configuration of the information processing system according to this exemplary embodiment.

The information processing system according to this exemplary embodiment is a system that virtually sets a shared area that is an area shared by a plurality of users in three-dimensional space by using technologies, such as augmented reality (AR), mixed reality (MR), and VR (virtual reality).

Here, "three-dimensional space" may be real space or virtual space. For example, AR technology or MR technology may be used to virtually set a shared area in real space, or VR technology may be used to virtually set a shared area in virtual space.

An example where AR technology or MR technology is used to virtually set a shared area in real space is described. More specifically, it is assumed that AR technology is used.

For example, AR glasses that are terminal apparatuses of eyewear type employing AR technology are used. AR glasses are apparatuses that have a display function, an image capture function, and a communication function. AR glasses have various sensors including a gyro sensor, an acceleration sensor, a geomagnetic sensor, and a global positioning system (GPS) sensor. The gyro sensor, the acceleration sensor, and the geomagnetic sensor are used to measure the tilt, acceleration, and bearing of the AR glasses, and the orientation and attitude of the AR glasses are calculated on the basis of the results of measurement. This calculation may be performed by the AR glasses or may be performed by an information processing apparatus 14. The GPS sensor is used to measure the position (for example, the latitude, longitude, and altitude) of the AR glasses. Information indicating the results of measurement by the sensors is transmitted to the information processing apparatus 14.

Instead of AR glasses, head-mounted displays (HMDs) employing AR technology or MR glasses (that is, terminal apparatuses of eyewear type) or HMDs employing MR technology may be used. Instead of AR glasses, mobile terminals, such as smartphones, mobile telephones, or game terminals, having a camera may be used. In a case where VR technology is used, VR glasses, HMDs, mobile terminals, etc. employing VR technology are used instead of AR glasses.

Hereinafter, an object present in real space may be referred to as "real object". A virtual object is a concept that is contrasted with a real object, and is, for example, an image, a character string, a figure, or other information. An image is a still image, a moving image, or a combination thereof. For example, a virtual object is displayed in a shared area virtually set in three-dimensional space.

In a case where AR technology or MR technology is used, a shared area may be defined as a specific area that is associated with a real object present in real space and that is set at a relative position with reference to the position of the real object, or may be defined as a specific area that is indicated by coordinates in real space without being associated with a real object. In the case where VR technology is used, a shared area may be defined as a specific area that is associated with a virtual object present in virtual space and that is set at a relative position with reference to the position of the virtual object, or may be defined as a specific area that is indicated by coordinates in virtual space without being associated with a virtual object.

A shared area is an area shared by users who are joining the information processing system according to this exemplary embodiment and is an area not shared by users who are not joining the information processing system. A user who is joining the information processing system is, for example, a user who is logged in to the information processing system or a user who is logged in to a service (for example, a meeting) provided by the information processing system. In the information processing system, one or more groups may be registered, and a shared area may be set for each group. In this case, a shared area set for a group is shared by users who belong to the group and is not shared by users who do not belong to the group. Users who share a shared area are allowed to, for example, access the shared area, display the shared area, display a virtual object in the shared area, view a virtual object in the shared area, and edit a virtual object in the shared area. Some of these functions may be restricted in accordance with the privileges of the users.

In the example illustrated in FIG. 1, the information processing system according to this exemplary embodiment includes AR glasses 10 and 12, the information processing apparatus 14, and a server 16. FIG. 1 illustrates two AR glasses; however, two or more AR glasses may be included in the information processing system. The AR glasses 10 and 12, the information processing apparatus 14, and the server 16 have a communication function of communicating with other apparatuses via a communication network N, such as a local area network (LAN) or the Internet. Each of these apparatuses may communicate with other apparatuses by using short-range wireless communication, such as Bluetooth (registered trademark).

The AR glass 10 includes a display device 10a of eyewear type and a camera 10b that captures an image of real space in the line-of-sight direction of a user wearing the AR glass 10. Similarly, the AR glass 12 includes a display device 12a of eyewear type and a camera 12b. Hereinafter, an image generated by image capturing by a camera is referred to as "captured image". The display devices 10a and 12a may be see-through display devices or may be non-see-through display devices. With AR technology, on the display devices 10a and 12a, an object is virtually displayed over a real object. Virtually displaying an object over a real object refers to superimposing on real space and displaying a virtual object that is an example of an image representing the object on the screens of the display devices 10a and 12a. For example, taking into consideration binocular disparity of a user, a screen for the left eye and a screen for the right eye are generated and displayed on left and right display devices respectively. When a user views real space through the display device 10a or the display device 12a, a virtual object is superimposed and displayed as if the virtual object is actually present in real space.

This exemplary embodiment assumes that the AR glass 10 is worn by a user A, the AR glass 12 is worn by a user B, and the users A and B are logged in to a service provided by the information processing system according to this exemplary embodiment.

The information processing apparatus 14 is, for example, a desktop or laptop personal computer (hereinafter referred to as "PC"), a tablet terminal, a smartphone, or a workstation and is an apparatus that assists a plurality of users in sharing information. For example, the information processing apparatus 14 virtually sets a shared area that is shared by a plurality of users in three-dimensional space. In the case where AR technology or MR technology is used, a shared area is virtually set in real space, and in the case where VR technology is used, a shared area is set in virtual space. For example, shared area data that is data defining a shared area is stored on the information processing apparatus 14 or the server 16, and the information processing apparatus 14 sets the shared area in accordance with the shared area data. The information processing apparatus 14 may superimpose on real space and display information that is shared by a plurality of users on the screens of the AR glasses.

The server 16 is an apparatus that stores and manages information etc. about a shared area. Note that the server 16 may be included in the information processing apparatus 14.

Figure 2:
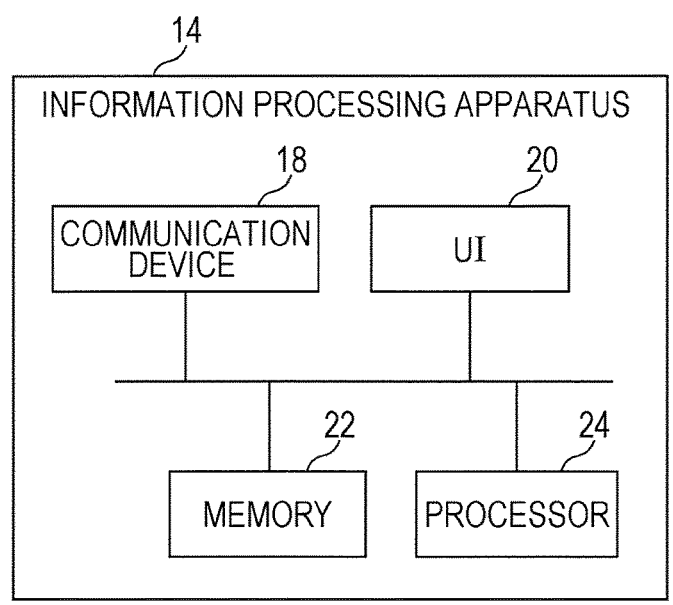
FIG. 2 is a block diagram illustrating a hardware configuration of an information processing apparatus.

Now, a hardware configuration of the information processing apparatus 14 is described with reference to FIG. 2. FIG. 2 illustrates an example hardware configuration of the information processing apparatus 14.

The information processing apparatus 14 includes, for example, a communication device 18, a user interface (UI) 20, a memory 22, and a processor 24.

The communication device 18 is a communication interface (for example, a network interface) including a communication chip, etc. and has a function of transmitting data to other apparatuses and a function of receiving data transmitted from other apparatuses.

The UI 20 is a user interface and includes at least one of a display device and an operation device. The display device is, for example, a liquid crystal display or an electroluminescence (EL) display. The operation device is, for example, a keyboard, an enter key, or an operation panel. The UI 20 may be a UI, such as a touch panel, that functions as both a display device and an operation device.

The memory 22 is a device that provides one or more storage areas for storing data. The memory 22 is implemented as, for example, a hard disk drive, various memories (for example, a random access memory (RAM), a dynamic random access memory (DRAM), and read-only memory (ROM)), other types of storage devices (for example, an optical disc), or a combination thereof.

The processor 24 is configured so as to control operations of the sections of the information processing apparatus 14. The processor 24 may include a memory. The processor 24 virtually sets in three-dimensional space in which a plurality of users are present, an intersection area that is an area in which the fields of view of the plurality of users intersect as a shared area that is shared by the plurality of users. For example, the processor 24 may virtually set a shared area in real space or may virtually set a shared area in virtual space. This process will be described in detail below.

Figures 3, 4, 5:
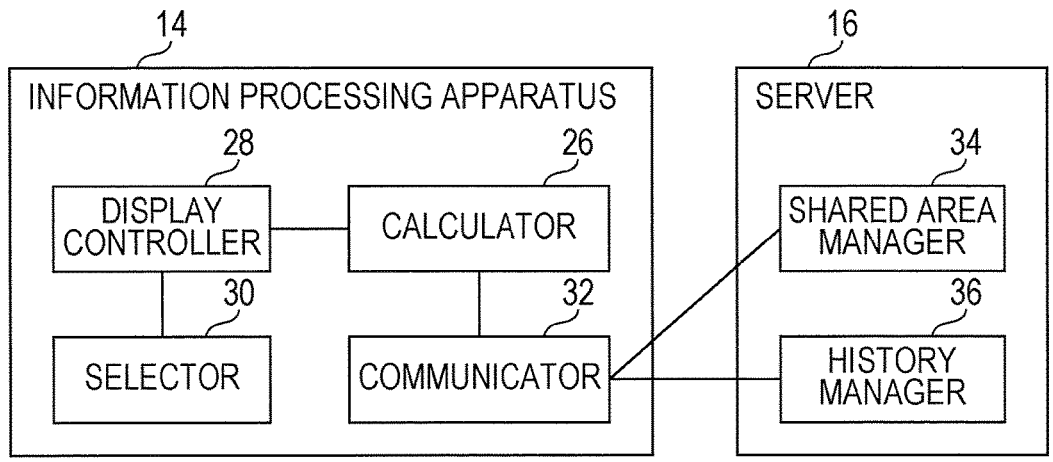
FIG. 3 is a block diagram illustrating a functional configuration of the information processing apparatus and a server.
FIG. 4 is a diagram illustrating a shared area management table.
FIG. 5 is a diagram illustrating a history management table.

Now, the functions of the information processing apparatus 14 and the server 16 are described with reference to FIG. 3. FIG. 3 illustrates an example functional configuration of the information processing apparatus 14 and the server 16.

The information processing apparatus 14 includes a calculator 26, a display controller 28, a selector 30, and a communicator 32. The server 16 includes a shared area manager 34 and a history manager 36.

The calculator 26 is configured to calculate an intersection area in which the fields of view of a plurality of users intersect in three-dimensional space (for example, real space or virtual space). For example, the calculator 26 calculates the orientation and attitude of the AR glass 10 in real space on the basis of the results of measurement by the various sensors provided in the AR glass 10. The AR glass 10 is worn by the user A, and the orientation and attitude thereof correspond to the orientation and attitude of the user A in real space. The calculator 26 presumes that the orientation of the AR glass 10 is the orientation of the line of sight of the user A, and presumes that an area that includes the line of sight and has a predetermined size is the field of view of the user A in real space. For example, the calculator 26 may presume that an area in which the line of sight of the user A is present at its center and that becomes wider as the distance from the user A increases is the field of view of the user A. As another example, the AR glass 10 may be provided with a sensor (for example, a generally available sensor) that measures the line of sight of the user A. In this case, the calculator 26 may presume that an area including a line of sight measured by the sensor is the field of view of the user A. As yet another example, the calculator 26 may estimate the line of sight of the user A toward a real object on the basis of the result of image recognition for a captured image generated by image capturing by the camera 10b of the AR glass 10, and presume that an area including the line of sight is the field of view of the user A. The calculator 26 estimates the field of view of the user B in real space in a similar manner.

The calculator 26 calculates an intersection area in which the field of view of the user A and the field of view of the user B intersect in three-dimensional space (for example, real space or virtual space), sets the calculated intersection area as a candidate for a shared area of the users A and B, and generates shared area data that defines the shared area. In the case where AR technology or MR technology is used, the calculator 26 calculates an intersection area in which the fields of view of respective users intersect in real space on the basis of the fields of view of the respective users in real space estimated as described above. In the case where VR technology is used, the calculator 26 calculates an intersection area in which the fields of view of respective users intersect in virtual space. A process to be performed in the case where VR technology is used will be described in detail below. The shared area data includes, for example, a shared area ID that is information for identifying the shared area, information indicating the number of vertices of the shared area, information indicating the coordinates of each vertex in three-dimensional space, and user IDs that are information for identifying users who share the shared area.

The calculator 26 may calculate a shared area candidate to be presented to the users in a case where an intersection area is not formed.

The display controller 28 is configured to superimpose on three-dimensional space (for example, real space or virtual space) and virtually display an intersection area calculated by the calculator 26 or a shared area used in the past as a shared area candidate. Shared area data that defines the shared area used in the past is managed by the history manager 36 described below. For example, the display controller 28 superimposes on real space and virtually displays a shared area candidate on the display screen of the display device 10a of the AR glass 10. Specifically, the display controller 28 calculates the display position of a shared area candidate on the display screen of the display device 10a on the basis of the position of the shared area candidate in real space and the orientation and attitude of the AR glass 10, and displays the shared area candidate at the calculated display position. The same applies to the AR glass 12 worn by the user B. In the case where VR technology is used, the shared area is displayed in virtual space.

The display controller 28 may display information, such as an object, for allowing a user to identify a shared area candidate. For example, the display controller 28 displays a line that outlines the shared area candidate or displays the shared area candidate semi-transparently.

The selector 30 is configured to select a shared area to be actually used by the users A and B from among shared area candidates displayed by the display controller 28. For example, the selector 30 may select a shared area in accordance with selection by the user A or the user B, may select a shared area in accordance with selection by a user having a privilege of selection, or may select a shared area candidate selected by both the users A and B as a shared area to be actually used. A user selects a shared area by, for example, gesture, speech, or an operation of the user's terminal apparatus.

The communicator 32 is configured to transmit information to the server 16 and receive information transmitted from the server 16. For example, the communicator 32 transmits shared area data generated by the calculator 26 to the server 16 and receives shared area data that defines a shared area used in the past from the server 16.

The shared area manager 34 is configured to manage shared areas. For example, shared area candidates and shared areas actually used in the past are managed by the shared area manager 34.

The history manager 36 is configured to manage shared areas used in the past.

Note that shared area data may be stored on the server 16 or may be stored on the information processing apparatus 14.

The calculator 26, the display controller 28, the selector 30, and the communicator 32 are implemented as the processor 24 included in the information processing apparatus 14. For implementation, the memory 22, etc. may be used. The shared area manager 34 and the history manager 36 are implemented as a processor included in the server 16. For implementation, a memory, etc. may be used. Note that the AR glasses 10 and 12 may have all or some of the functions of the information processing apparatus 14 or may have all or some of the functions of the server 16.

Now, information managed by the shared area manager 34 is described with reference to FIG. 4. FIG. 4 illustrates an example shared area management table for managing shared areas.

In the shared area management table, for example, a shared area ID, information indicating the number of vertices of the shared area, and information indicating the coordinates of each vertex in three-dimensional space (for example, real space or virtual space) are associated with one another. The coordinates of a vertex are, for example, coordinates in a three-dimensional rectangular coordinate system (for example, X coordinate, Y coordinate, and Z coordinate) and are coordinates of a relative position with reference to the coordinates of a predetermined position in three-dimensional space.

Now, information managed by the history manager 36 is described with reference to FIG. 5. FIG. 5 illustrates an example history management table for managing shared areas used in the past.

In the history management table, for example, a shared area ID that is information for identifying a shared area used in the past, information indicating the number of vertices of the shared area, information indicating the coordinates of each vertex in three-dimensional space (for example, real space or virtual space), and user IDs that are information for identifying users who used the shared area are associated with one another.

Figure 6:
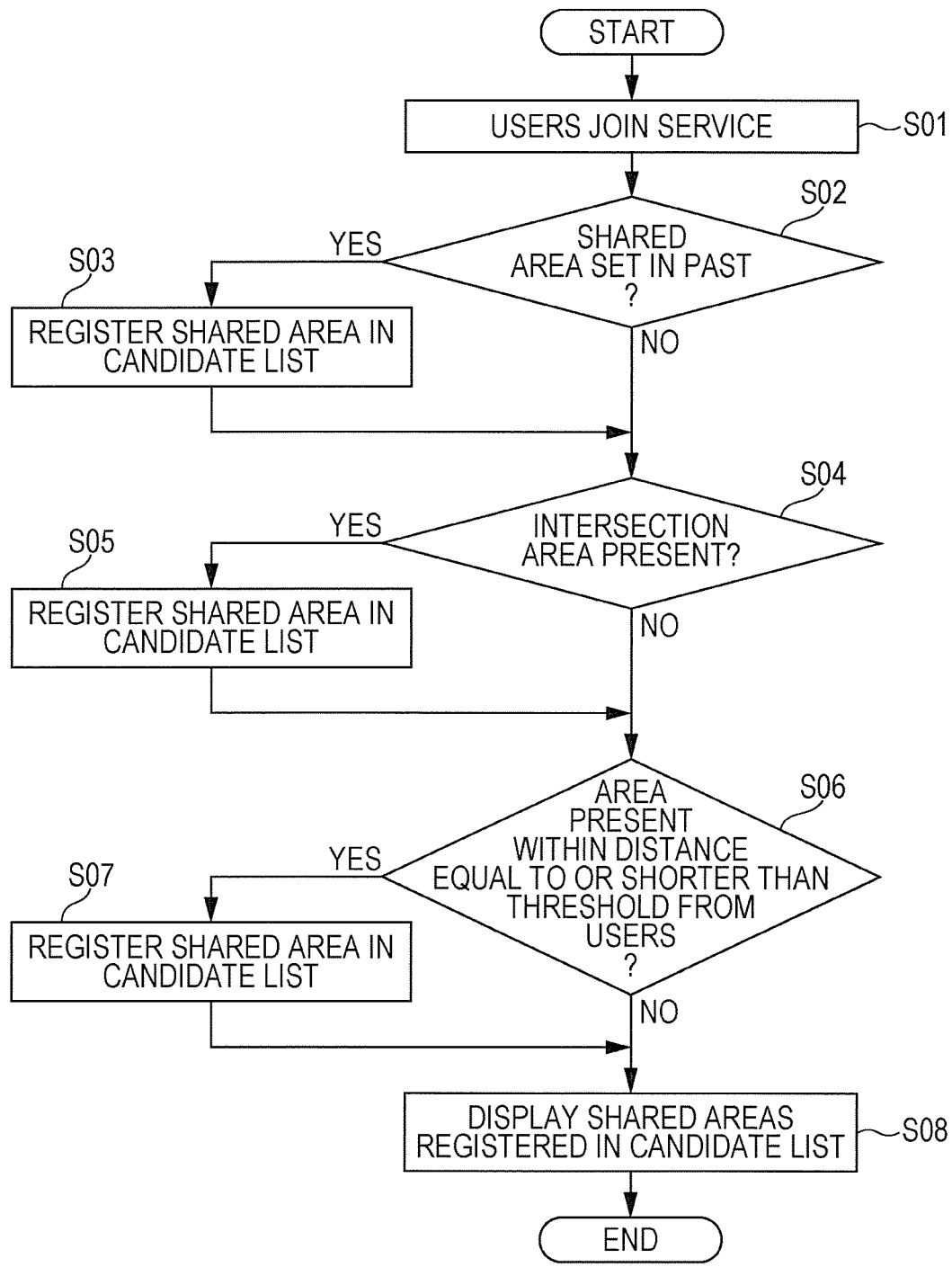
FIG. 6 is a flowchart illustrating processing by the information processing system according to this exemplary embodiment.

Now, processing by the information processing system according to this exemplary embodiment is described with reference to FIG. 6. FIG. 6 is a flowchart illustrating the processing.

First, users join a service (for example, a meeting using a virtual shared area) provided by the information processing system (S01). When the users join the service, the service is started. It is assumed here that the users A and B log in to the information processing system and join a meeting provided by the information processing system. The user A is wearing the AR glass 10, and the user B is wearing the AR glass 12. For example, the user A logs in to the information processing system using the AR glass 10 or a terminal apparatus, such as a smartphone. The same applies to the user B. For the login, a user ID is used, and the user ID is transmitted to the information processing apparatus 14 from an apparatus used in the login (for example, the AR glass or terminal apparatus). The user IDs of the users A and B are transmitted to the information processing apparatus 14. After the start of a service, such as a meeting, a user may join the service in the middle of the meeting.

Next, the display controller 28 refers to the history management table managed by the history manager 36 to check whether a shared area used in the past by the users who are joining the meeting is present (S02). Here, the users A and B are joining the meeting, and the display controller 28 checks whether a shared area used in the past by the users A and B is present. More specifically, the display controller 28 checks whether a shared area associated with the user IDs of both the users A and B is registered in the history management table.

In a case where a shared area used in the past by the users A and B is present, that is, in a case where a shared area associated with the user IDs of both the users A and B is registered in the history management table (Yes in S02), the display controller 28 registers the shared area in a shared area candidate list as a shared area candidate (S03). Thereafter, the flow proceeds to step S04. Note that instead of a shared area used in the past by all the users joining a meeting, the display controller 28 may register in the shared area candidate list as a shared area candidate, a shared area used in the past by at least a predetermined number of users among all the users or a shared area used in the past by at least a predetermined proportion of all the users. For example, in a case where three users are joining a meeting and where two users among the three users used the same shared area in the past, the display controller 28 may register the shared area in the shared area candidate list. As another example, in a case where more than half the users who are joining a meeting used the same shared area in the past, the display controller 28 may register the shared area in the shared area candidate list. For example, in a case where a shared area used in the past by the user A among the users A and B is present, the display controller 28 may register the shared area in the shared area candidate list.

In a case where a shared area used in the past by the user A or B is not present, that is, in a case where a shared area associated with the user ID of the user A or B is not registered in the history management table (No in S02), the flow proceeds to step S04.

Next, the calculator 26 estimates the orientation and attitude of the user A in real space on the basis of the results of measurement by the various sensors provided in the AR glass 10, and estimates the field of view of the user A in real space on the basis of the results of estimation. The calculator 26 similarly estimates the field of view of the user B. The calculator 26 calculates an intersection area in which the field of view of the user A and the field of view of the user B intersect in real space (S04). The same applies to a case where MR technology is used. In the case where VR technology is used, the calculator 26 calculates an intersection area in which the field of view of the user A and the field of view of the user B intersect in virtual space.

In a case where an intersection area in which the field of view of the user A and the field of view of the user B intersect is present (Yes in S04), the display controller 28 registers the intersection area in the shared area candidate list as a shared area candidate (S05). Thereafter, the flow proceeds to step S06.

In a case where an intersection area in which the field of view of the user A and the field of view of the user B intersect is not present (No in S04), the flow proceeds to step S06.

In the case where an intersection area is not present, the calculator 26 may superimpose on real space and display on the display devices 10a and 12a of the AR glasses 10 and 12 of the users A and B, information, such as a guide, on which the users A and B are to turn their gazes for forming an intersection area. The same applies to the case where MR technology is used. In the case where VR technology is used, information, such as a guide, is displayed in virtual space.

Next, the calculator 26 calculates an area that is present within a predetermined distance from each user and that can be a shared area candidate (S06). For example, the calculator 26 calculates an area that is present within a predetermined distance from the positions of the users A and B and that can be a shared area candidate. The same applies to the case where MR technology is used. For example, the position of the user A is determined by the GPS sensor provided in the AR glass 10, and the position of the user B is determined by the GPS sensor provided in the AR glass 12. Note that the distance from a user may change in accordance with the physical characteristics of the user. For example, information indicating the physical characteristics (for example, height, arm's length, etc.) of each user may be stored in advance in the memory 22 of the information processing apparatus 14, and the calculator 26 may use the physical characteristics of each user to calculate an area that is present within a predetermined distance from the user. In the case where VR technology is used, the calculator 26 calculates an area that is present within a predetermined distance from the positions of the users A and B in virtual space and that can be a shared area candidate.

In a case where an area that can be a shared area candidate is present within the predetermined distance from each user (Yes in S06), the display controller 28 registers the area in the shared area candidate list as a shared area candidate (S07). Thereafter, the flow proceeds to step S08.

In a case where an area that can be a shared area candidate is not present within the predetermined distance from each user (No in S06), the flow proceeds to step S08.

The display controller 28 superimposes on real space and virtually displays shared area candidates registered in the shared area candidate list on the screen of the display device 10a of the AR glass 10 and the screen of the display device 12a of the AR glass 12 (S08). The same applies to the case where MR technology is used. In the case where VR technology is used, shared area candidates are displayed in virtual space. The display controller 28 may display a list of the candidates or may display the candidates one after another. For example, the display controller 28 may first display a shared area used in the past and subsequently display an area not used in the past.

The shared area candidates registered in the shared area candidate list are associated with respective shared area IDs and managed by the shared area manager 34. For example, the shared area candidates are registered in the shared area management table illustrated in FIG. 4. Shared area data that defines each shared area is stored on the information processing apparatus 14 or the server 16.

Now, specific examples are used to further describe in detail the processing by the information processing system according to this exemplary embodiment.

Figure 7:
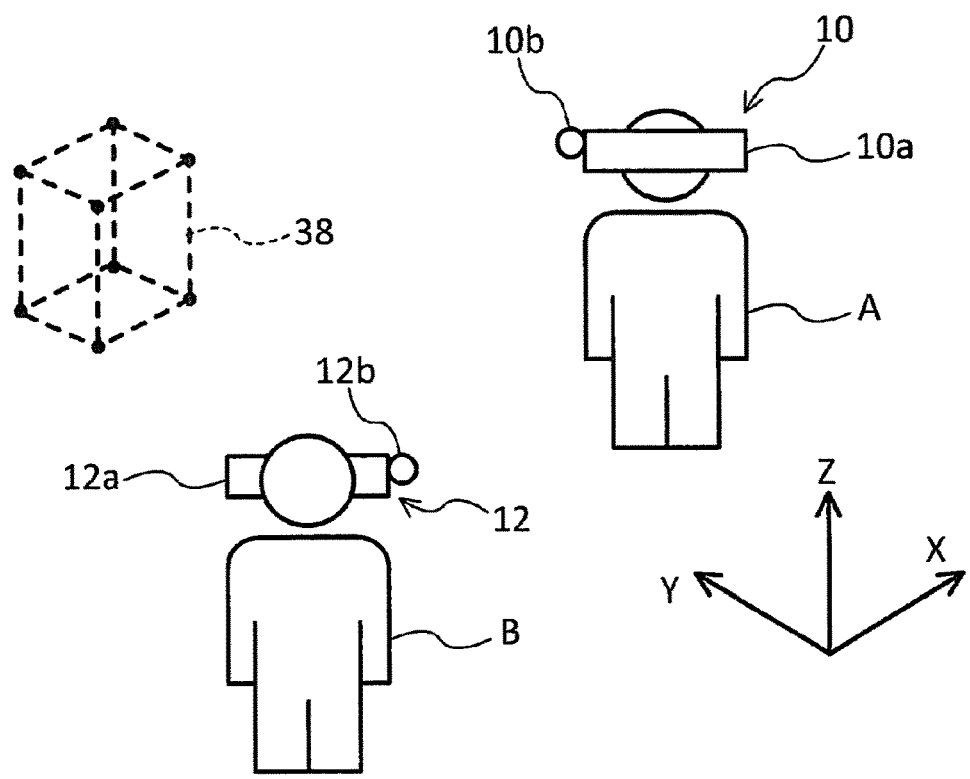
FIG. 7 is a diagram schematically illustrating users present in three-dimensional space.

FIG. 7 illustrates the users A and B present in three-dimensional space (for example, real space or virtual space). Here, AR technology is used, and FIG. 7 illustrates the users A and B present in real space. The same applies to the case where MR technology is used. A description is given below of a case where three-dimensional space is real space and where AR technology is used; however, a similar process is performed also in the case where MR technology is used. In the case where VR technology is used, three-dimensional space is virtual space, and a process described below is performed in virtual space. The X axis, Y axis, and Z axis illustrated in FIG. 7 are axes orthogonal to one another and are axes that form a three-dimensional rectangular coordinate system in real space.

The user A is wearing the AR glass 10, and the user B is wearing the AR glass 12. When the users A and B log in to the information processing system and join a service (for example, a meeting) provided by the information processing system, the service starts. In a case where a shared area used in the past by the users A and B is present, the shared area is virtually displayed in real space as a shared area candidate. For example, an area 38 is a shared area used in the past by the users A and B. In this case, the display controller 28 superimposes on real space and virtually displays the area 38 on the screen of the display device 10a of the AR glass 10 and the screen of the display device 12a of the AR glass 12. For example, the display controller 28 may display a line outlining the area 38, may display the area 38 semi-transparently, or may color and display the area 38. The area 38 may be a three-dimensional area or a two-dimensional area. The area 38 may be a shared area used in the past by a user among the users A and B. In this case, the display controller 28 may display the name, user ID, etc. of the user. As another example, the area 38 may be a shared area set by a user among the users A and B who hosted a service (for example, a meeting) in the past. In this case, the display controller 28 may display the name, user ID, etc. of the user.

In a case where one of the plurality of users joining a service, at least a predetermined number of users among the plurality of users, all the plurality of users, or a user among the plurality of users who has a privilege of selection selects a shared area to be actually used from among shared area candidates, the selector 30 determines the selected shared area candidate to be an actually used shared area. In this case, the display controller 28 superimposes on real space and virtually displays the selected shared area on the screen of the display device of the AR glass of each user. For example, the display controller 28 displays a virtual object that is shared by the plurality of users joining the service in the shared area. The users joining the service are allowed to, for example, view the virtual object in the shared area. When a user specifies a virtual object and gives an instruction for display, the display controller 28 displays the specified virtual object in the shared area. A user selects a shared area by, for example, gesture, speech, or an operation of the user's terminal apparatus.

Figure 8:
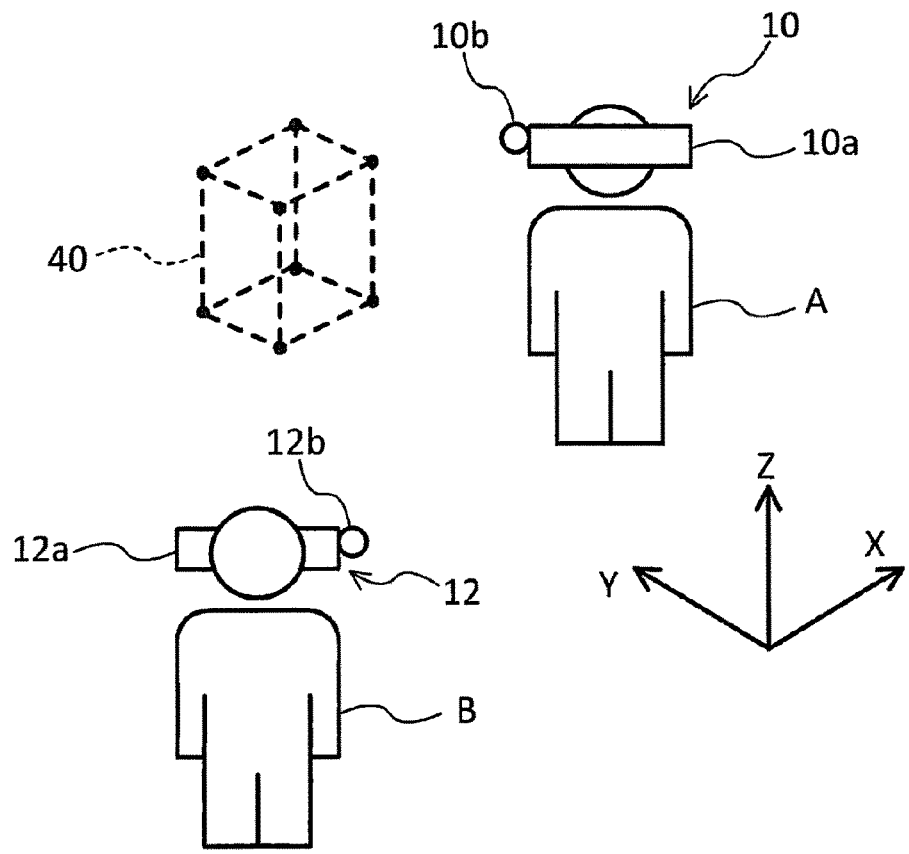
FIG. 8 is a diagram schematically illustrating users present in three-dimensional space.

In a case where a plurality of shared area candidates are present and overlap in real space, the display controller 28 may display the overlapping candidates so as to switch between the candidates at predetermined time intervals. This is described with reference to FIG. 7 and FIG. 8. FIG. 8 illustrates the users A and B present in three-dimensional space (for example, real space or virtual space). Here, the users A and B present in real space are illustrated. An area 40 illustrated in FIG. 8 is an area different from the area 38 illustrated in FIG. 7 and is a shared area used in the past by the users A and B. That is, both the areas 38 and 40 were used in the past by the users A and B. In this case, the display controller 28 superimposes on real space and displays on the screen of the display device 10a of the AR glass 10 and the screen of the display device 12a of the AR glass 12, the areas 38 and 40 so as to switch between the areas at predetermined time intervals. For example, the display controller 28 displays the area 38, and after the elapse of the predetermined time, displays the area 40 without displaying the area 38. After the elapse of the predetermined time since display of the area 40, the display controller 28 displays the area 38 without displaying the area 40. Thereafter, the display controller 28 repeats this process. In a case where the areas 38 and 40 overlap in real space (for example, the areas 38 and 40 partially overlap), the display controller 28 may display the areas 38 and 40 so as to switch between the areas at predetermined time intervals. The same applies to the case where MR technology is used. In the case where VR technology is used, shared area candidates are displayed in virtual space.

Now, an example where an intersection area is calculated is described.

Figure 9:
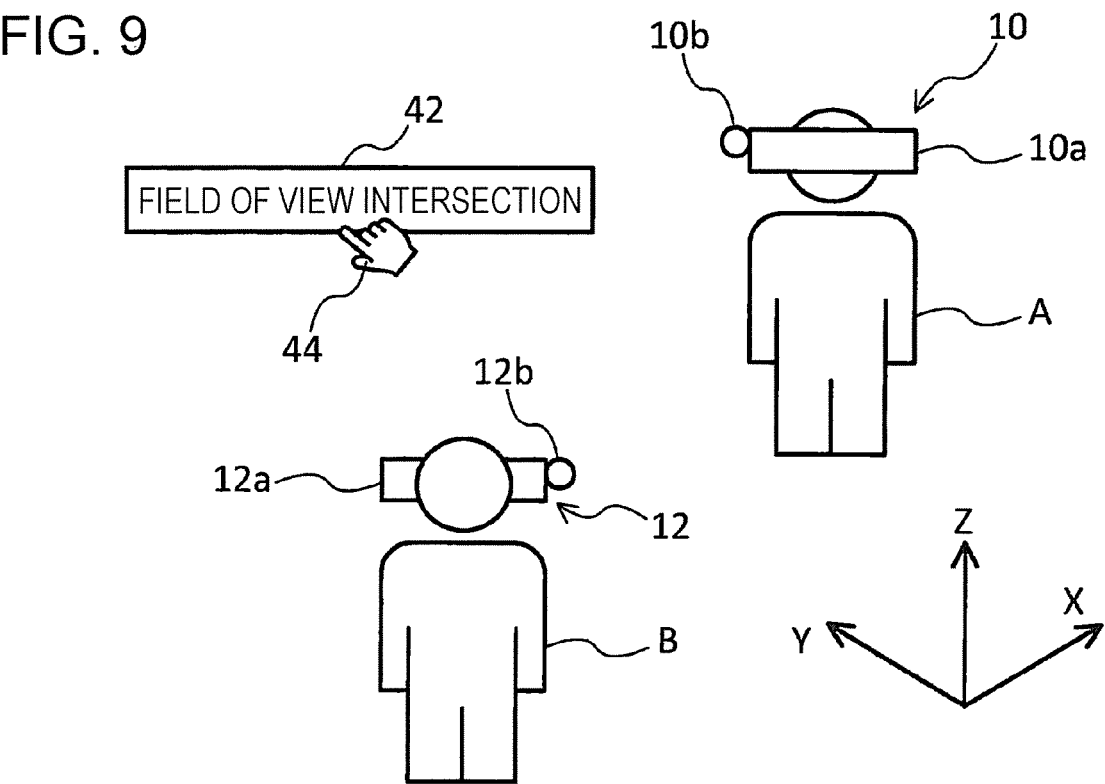
FIG. 9 is a diagram schematically illustrating users present in three-dimensional space.

FIG. 9 illustrates the users A and B present in real space. For example, the display controller 28 superimposes on real space and virtually displays on the screen of the display device 10a of the AR glass 10 and the screen of the display device 12a of the AR glass 12, a button 42 for giving an instruction for calculating an intersection area. When the user A or the user B presses the button 42 by, for example, gesture, speech, or an operation of their terminal apparatus as indicated by a reference numeral 44, the mode of the information processing apparatus 14 transitions to an intersection area calculation mode, and the information processing apparatus 14 executes a function of calculating an intersection area.

Figure 10:
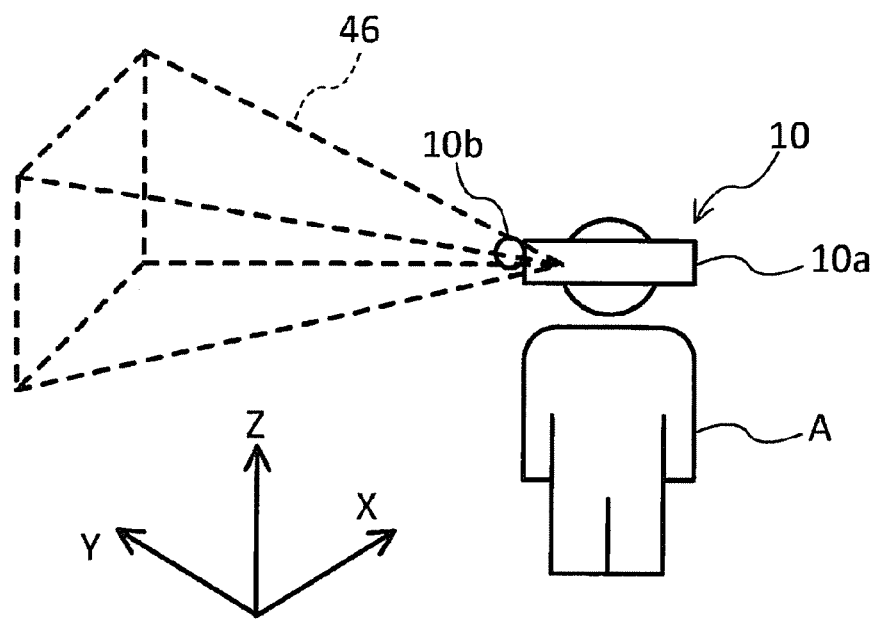
FIG. 10 is a diagram schematically illustrating a user present in three-dimensional space.
Figure 11:
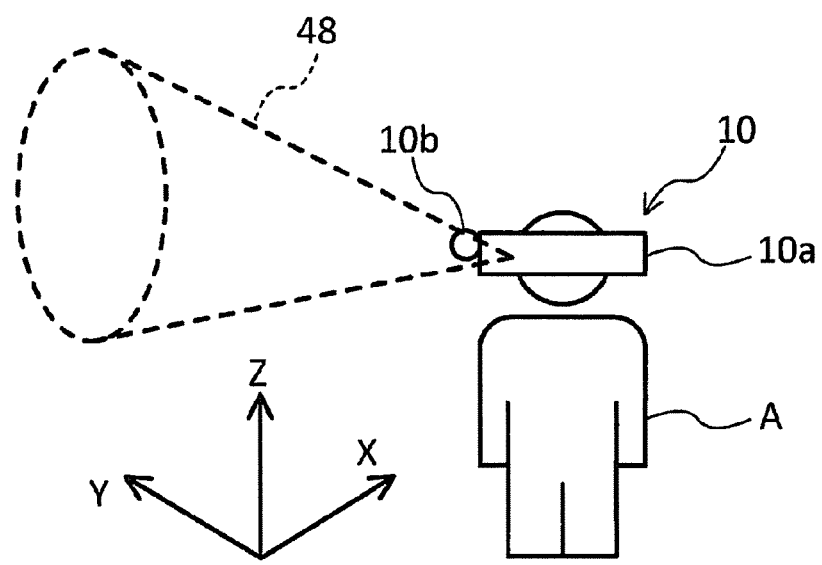
FIG. 11 is a diagram schematically illustrating a user present in three-dimensional space.

In the intersection area calculation mode, the calculator 26 estimates the orientation and attitude of the user A in real space on the basis of the results of measurement by the various sensors provided in the AR glass 10, and estimates the field of view of the user A in real space on the basis of the results of estimation. The display controller 28 superimposes on real space and virtually displays the estimated field of view on the display screen of the display device 10a of the AR glass 10. For example, the display controller 28 may display a line that outlines the field of view or may display the field of view semi-transparently. FIG. 10 illustrates an estimated field of view 46 of the user A. Here, for example, lines that outline the field of view 46 of the user A are displayed. The field of view 46 has, for example, a quadrangular pyramid shape. This shape is only an example, and the field of view may have a circular cone shape like a field of view 48 illustrated in FIG. 11. The shape and size of the field of view may be determined in advance or may be changed by a user operation. The calculator 26 also estimates the field of view of the user B, and the display controller 28 superimposes on real space and virtually displays the estimated field of view on the display screen of the display device 12a of the AR glass 12. The same applies to the case where MR technology is used. In the case where VR technology is used, the field of view is displayed in virtual space.

The calculator 26 calculates an intersection area in which the field of view of the user A and the field of view of the user B intersect in real space. The display controller 28 superimposes on real space and virtually displays the calculated intersection area on the display screens of the display device 10a and the display device 12a as a shared area candidate. The same applies to the case where MR technology is used. In the case where VR technology is used, the intersection area is displayed in virtual space.

The intersection area calculation mode may automatically end in a case where the intersection area has been calculated. The intersection area calculation mode may automatically end in a case where a shared area to be actually used has been selected from among shared area candidates. The intersection area calculation mode may automatically end after the elapse of a predetermine time since the start of use of a service (for example, a meeting) after selection of the shared area. Before the time elapses, an intersection area may be calculated and the calculated intersection area may be displayed as a shared area candidate.

In a case where an intersection area calculated by the calculator 26 calculates has a size (for example, a volume or surface area) equal to or larger than a predetermined threshold, the display controller 28 may display the intersection area as a shared area candidate.

The calculator 26 may calculate an area that is formed when the field of view of the user A and the field of view of the user B intersect for a predetermined time or more as an intersection area, and need not calculate an area that is formed when the field of view of the user A and the field of view of the user B intersect for less than the predetermined time as an intersection area.

Now, a process that is performed in a case where an intersection area is not formed is described.

Figure 12:
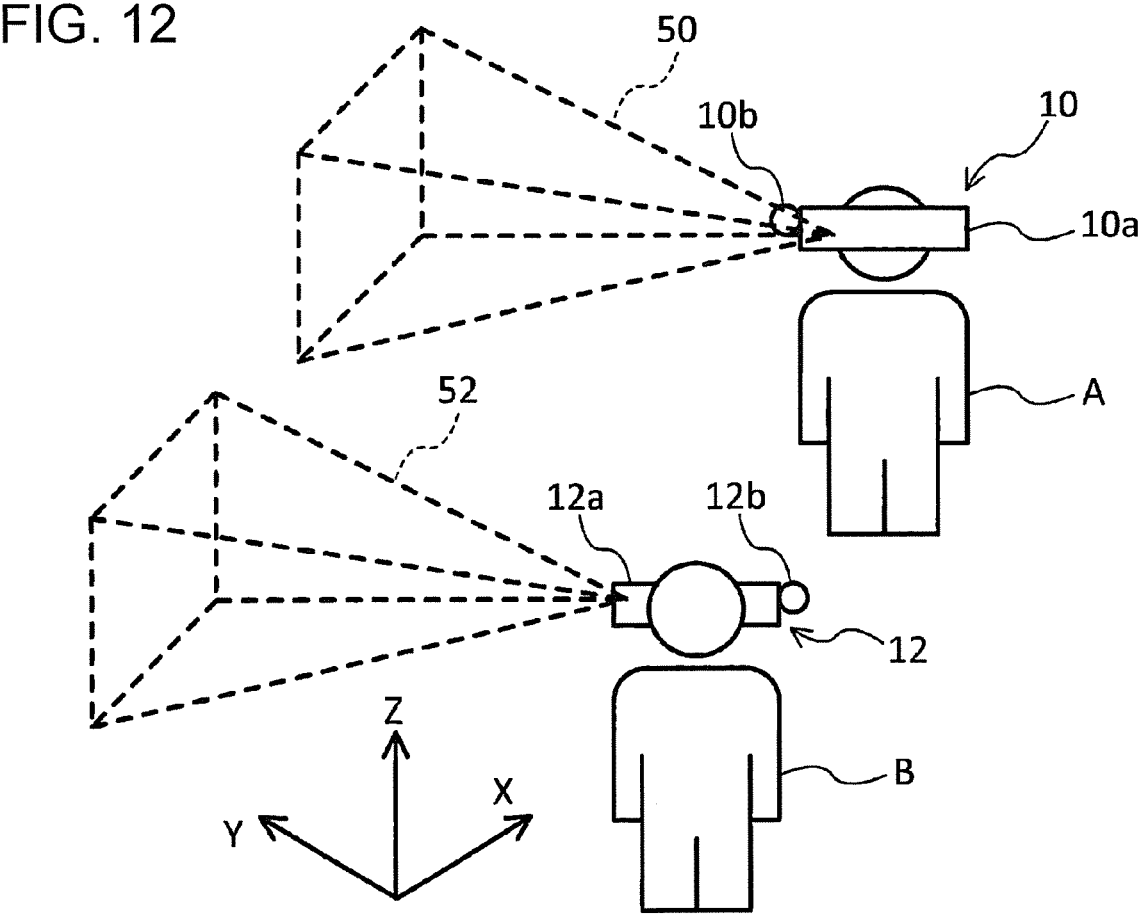
FIG. 12 is a diagram schematically illustrating users present in three-dimensional space.

FIG. 12 illustrates the users A and B present in three-dimensional space (for example, real space or virtual space). Here, the users A and B present in real space are illustrated. A field of view 50 is the field of view of the user A, and a field of view 52 is the field of view of the user B. In the example illustrated in FIG. 12, the fields of view 50 and 52 do not intersect, and an intersection area is not formed. In this case, the display controller 28 virtually displays in real space information, such as a guide, on which the users A and B are to turn their gazes for forming an intersection area.

Figure 13:
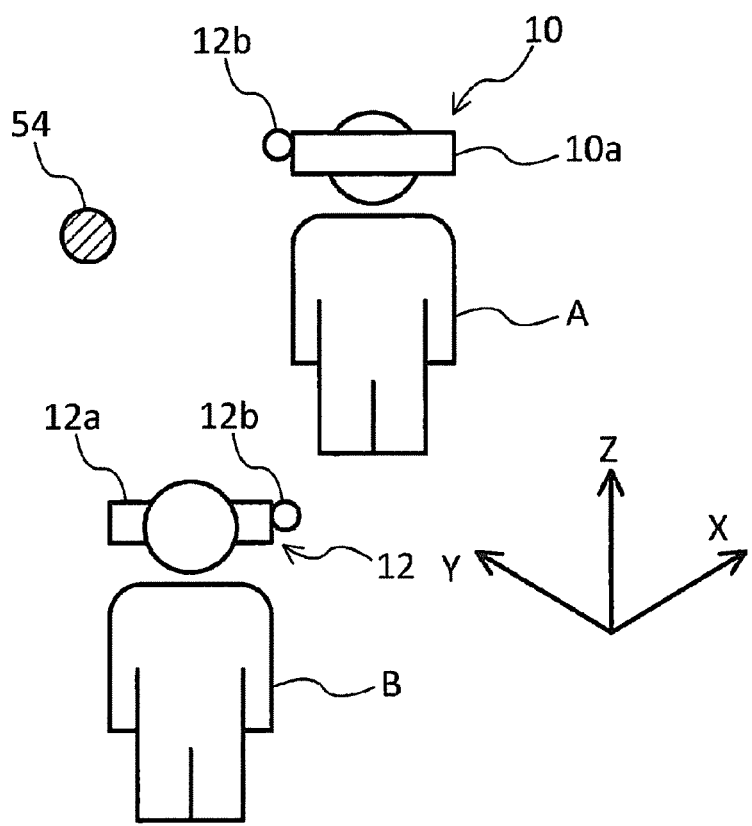
FIG. 13 is a diagram schematically illustrating users present in three-dimensional space.

In FIG. 13, a guide 54 is illustrated. The guide 54 is superimposed on real space and virtually displayed on the display screens of the display device 10a and the display device 12a. For example, on the basis of the position of the field of view 50 of the user A and the position of the field of view 52 of the user B, the display controller 28 calculates a position for which movements of the fields of view 50 and 52 are smallest, and virtually displays the guide 54 at the calculated position. The position for which movements of the fields of view 50 and 52 are smallest is, for example, a position for which the sum of the amount of movement of the field of view 50 and the amount of movement of the field of view 52 is smallest. The position for which movements of the fields of view 50 and 52 are smallest may be a position (for example, a middle position) between the field of view 50 and the field of view 52. As another example, the guide 54 may be displayed at a position (for example, a middle position) between the position of the user A and the position of the user B. As yet another example, the guide 54 may be displayed at a position (for example, a middle position) that is between the position of the user A and the position of the user B and for which movements of the fields of view 50 and 52 are smallest. The display controller 28 may superimpose on real space and virtually display a message saying, for example, "please turn your gaze on the guide 54" on the display screens of the display device 10a and the display device 12a.

Figure 14:
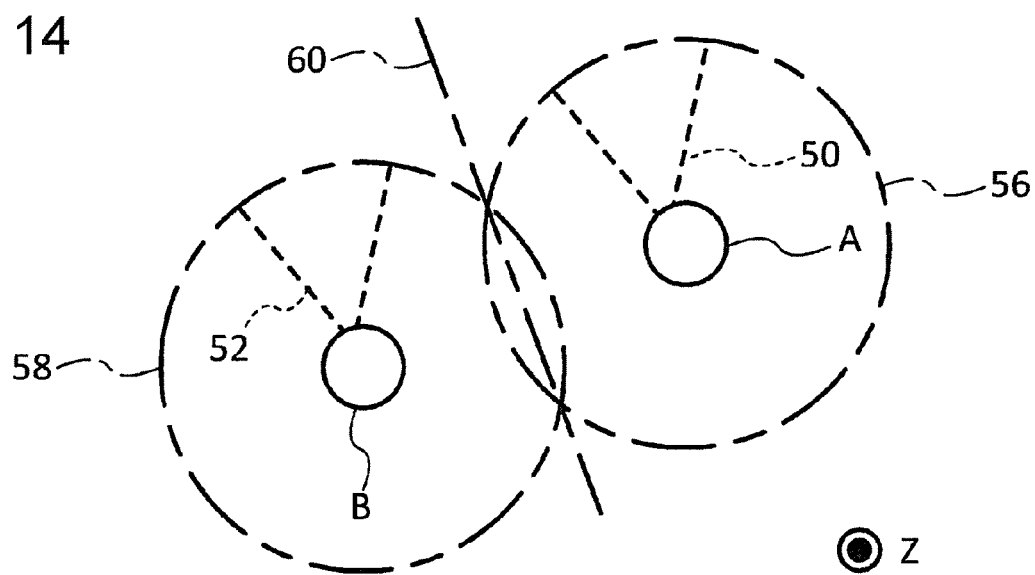
FIG. 14 is a diagram illustrating users when viewed in a Z-axis direction.
Figure 15:
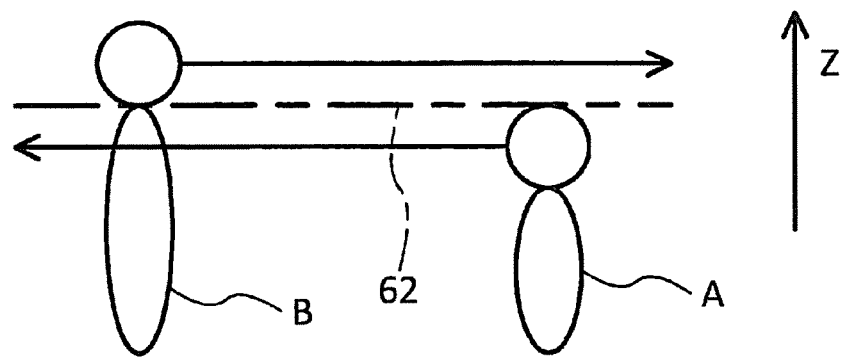
FIG. 15 is a diagram illustrating users when viewed in an X-axis direction or a Y-axis direction.

Here, an example position at which the guide is displayed is described in detail with reference to FIG. 14 and FIG. 15. FIG. 14 illustrates the users A and B when viewed from above (that is, in the Z-axis direction). FIG. 15 illustrates the users A and B when viewed in the X-axis direction or the Y-axis direction.

In FIG. 14, loci 56 and 58 are illustrated. The locus 56 is the locus of the line of sight of the user A and can be formed by the user A changing their orientation. The locus 58 is the locus of the line of sight of the user B and can be formed by the user B changing their orientation. The loci 56 and 58 are formed on a plane that includes the X axis and the Y axis (that is, a plane orthogonal to the Z axis). The calculator 26 calculates the locus 56 on the basis of the position of the user A in real space and calculates the locus 58 on the basis of the position of the user B in real space. The calculator 26 calculates a position at which the distances from the users A and B are equal to each other on the basis of the positions of the users A and B. A line 60 is a line that indicates a position at which the distances from the users A and B are equal to each other.

A line 62 illustrated in FIG. 15 is a line that indicates the average height of the eye height of the user A and the eye height of the user B. For example, the calculator 26 presumes that the height of the AR glass 10 is the eye height of the user A and that the height of the AR glass 12 is the eye height of the user B, and calculates the average height of the eye heights. The calculated height is indicated by the line 62.

For example, the calculator 26 calculates a position that is on the lines 60 and 62 and for which movements of the field of view 50 of the user A and the field of view 52 of the user B are smallest. That is, the calculator 26 calculates a position at which the distances from the users A and B are equal to each other, that is at the average height of the eye heights of the users A and B, and for which movements of the fields of view 50 and 52 are smallest. The display controller 28 displays the guide 54 at the calculated position.

The calculator 26 may calculate a position at which the size (for example, the volume or surface area) of the intersection area is largest, and the display controller 28 may display the guide 54 at the calculated position.

In the case where MR technology is used, the guide 54 is virtually displayed in real space as in the case where AR technology is used. In the case where VR technology is used, the guide is displayed in virtual space.

Figure 16:
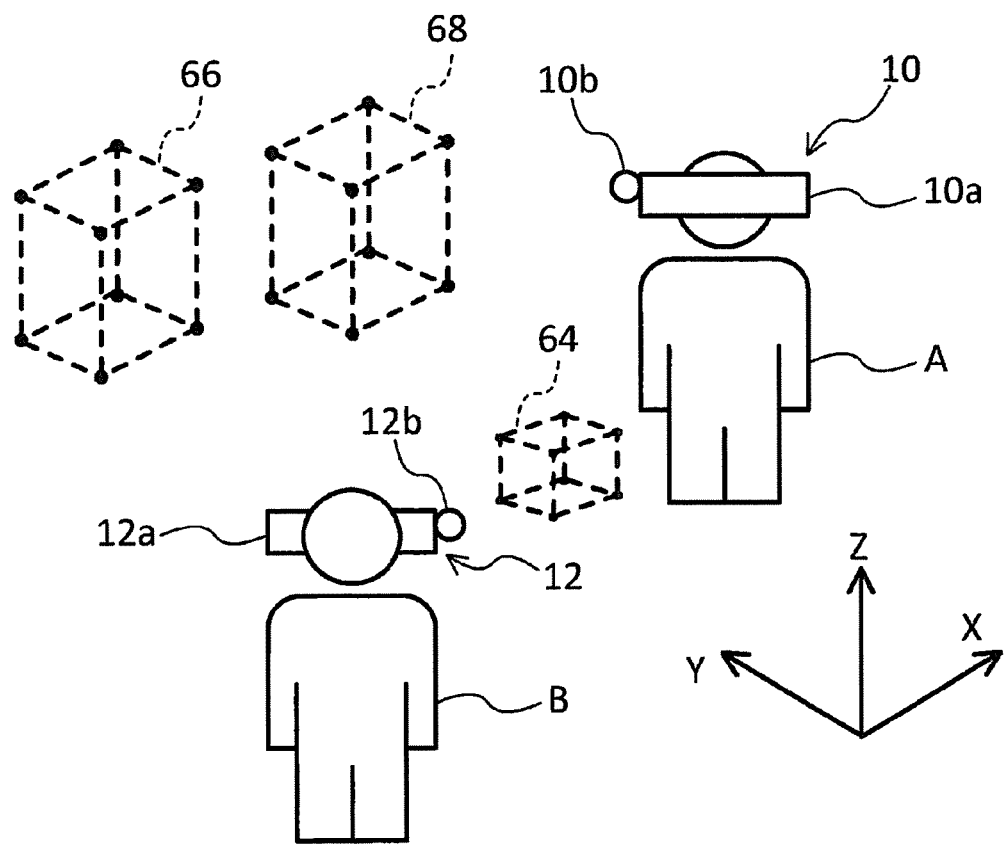
FIG. 16 is a diagram schematically illustrating users present in three-dimensional space.

In FIG. 16, separate shared area candidates are illustrated. An area 64 is an area that is present within a predetermined distance (for example, within 1 m) from the positions of the users A and B in real space. The calculator 26 calculates the area 64 on the basis of the positions of the users A and B in real space. The area 64 is an area that can be a shared area candidate, and the display controller 28 superimposes on real space and virtually displays the area 64 on the display screens of the display device 10a and the display device 12a as a shared area candidate. The same applies to the case where MR technology is used. In the case where VR technology is used, the area 64 is displayed in virtual space. The display controller 28 may display information indicating the reason why the area 64 is displayed as a shared area candidate. For example, the display controller 28 displays, for example, a message saying that the area 64 is an area present within a predetermined range from the positions of the users A and B.

As another example, in a case where an intersection area in which the fields of view of a plurality of users intersect is formed within a predetermined distance from the positions of the plurality of users, the display controller 28 may display the intersection area as a shared area candidate. For example, in a case where an intersection area in which the field of view of the user A and the field of view of the user B present in real space intersect is formed within a predetermined distance from the positions of the users A and B, the display controller 28 superimposes on real space and virtually displays the intersection area on the display screens of the display device 10a and the display device 12a as a shared area candidate. The same applies to the case where MR technology is used. In the case where VR technology is used, the intersection area is displayed in virtual space.

As illustrated in FIG. 16, the display controller 28 may superimpose on real space and virtually display an area 66 used in the past as a shared area and an area 68 that is an intersection area of the users A and B on the display screens of the display device 10a and the display device 12a as shared area candidates together with the area 64.

Figure 17:
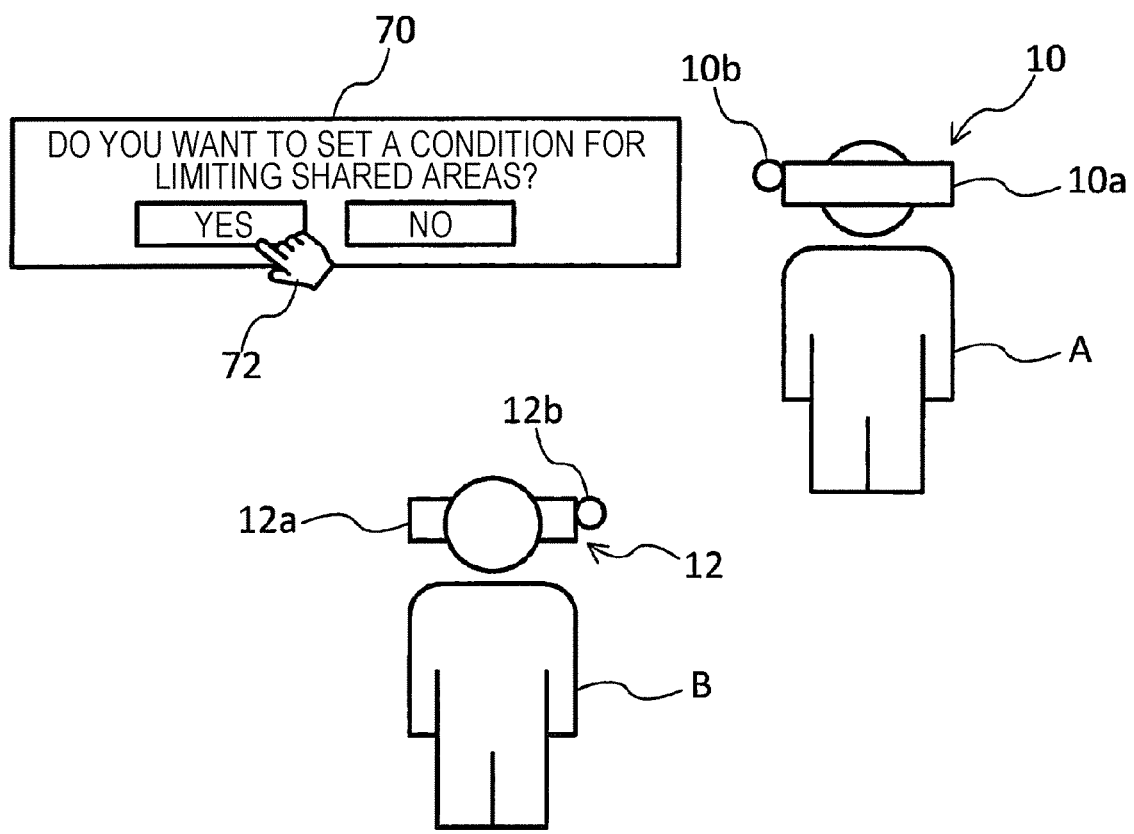
FIG. 17 is a diagram schematically illustrating users present in three-dimensional space.
Figure 18:
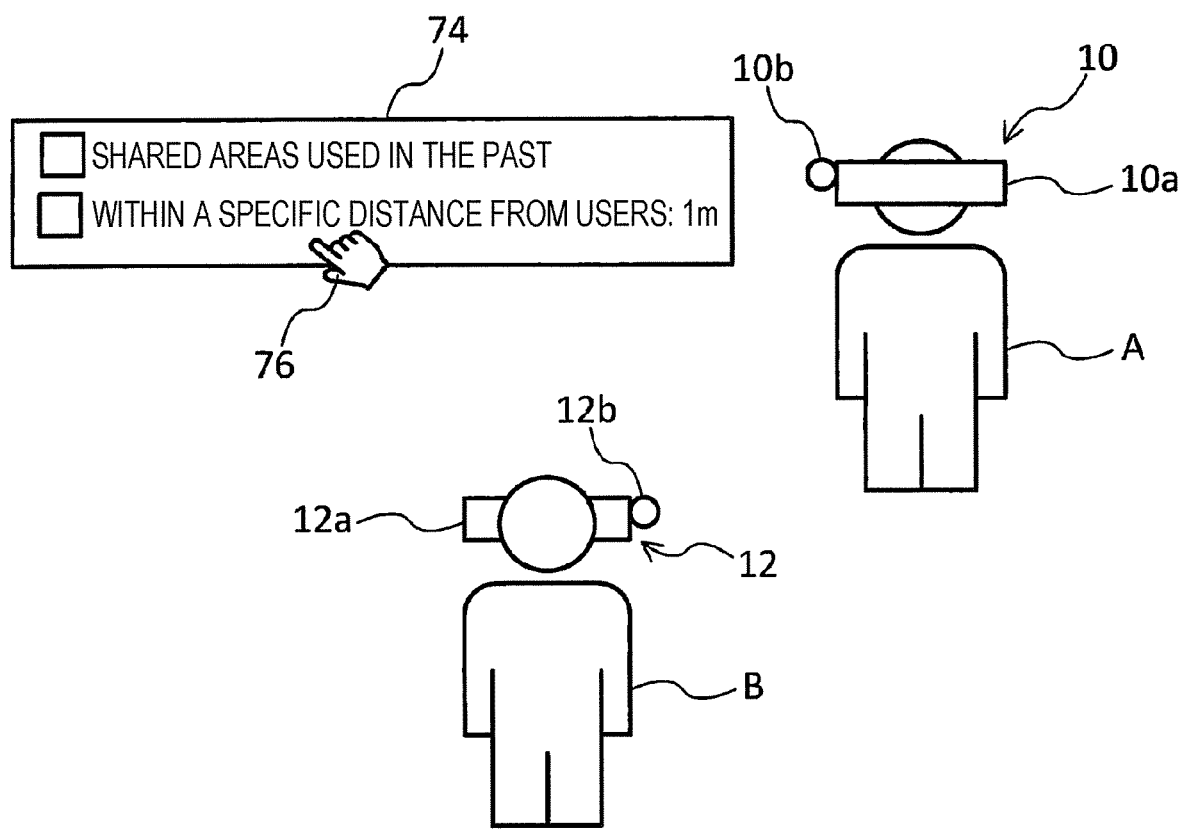
FIG. 18 is a diagram schematically illustrating users present in three-dimensional space.

A user may specify a condition for a shared area candidate to be displayed, or a shared area candidate may be displayed in accordance with a user instruction. Now, these processes are described with reference to FIG. 17 and FIG. 18. FIG. 17 and FIG. 18 illustrate the users A and B present in three-dimensional space (for example, real space or virtual space). Here, the users A and B present in real space are illustrated.

As illustrated in FIG. 17, the display controller 28 superimposes on real space and virtually displays on the display screens of the display device 10a and the display device 12a, an image 70 for a user to give an instruction for specifying whether to set a condition for limiting shared areas. In the image 70, a "yes" button and a "no" button are displayed. When any of the users A and B presses the "no" button, the display controller 28 superimposes on real space and virtually displays all candidates registered in the shared area candidate list on the display screens of the display device 10a and the display device 12a. The same applies to the case where MR technology is used. In the case where VR technology is used, the image 70 is displayed in virtual space.

When any of the users A and B presses the "yes" button as indicated by a reference numeral 72, the display controller 28 superimposes on real space and virtually displays on the display screens of the display device 10a and the display device 12a, a setting field 74 for a user to set a condition for limitation as illustrated in FIG. 18. In FIG. 18, as conditions for limitation, a condition "shared areas used in the past" and a condition "within a specific distance from users: 1 m" are displayed in the setting field 74. When any of the users A and B specifies a condition for limitation as indicated by a reference numeral 76, the display controller 28 superimposes on real space and virtually displays on the display screens of the display device 10a and the display device 12a, shared area candidates that match the specified condition for limitation. The same applies to the case where MR technology is used. In the case where VR technology is used, the setting field 74 is displayed in virtual space.

For example, in a case where the condition "shared areas used in the past" is specified, the display controller 28 displays shared areas used in the past by the users A and B as shared area candidates. In a case where the condition "within a specific distance from users: 1 m" is specified, the display controller 28 displays shared area candidates that are present within a range of 1 m from the positions of the users A and B. In a case where none of the conditions for limitation displayed in the setting field 74 is specified, the display controller 28 may display the intersection area as a shared area candidate. For example, after the elapse of a predetermined time since display of the setting field 74, the display controller 28 displays the intersection area as a shared area candidate.

When a shared area to be actually used is selected by a user from among the shared area candidates, the selector 30 sets the shared area candidate selected by the user as a shared area to be shared by each user joining a service (for example, a meeting). Each user joining a service is allowed to, for example, view a virtual object in the shared area.

Figure 19:
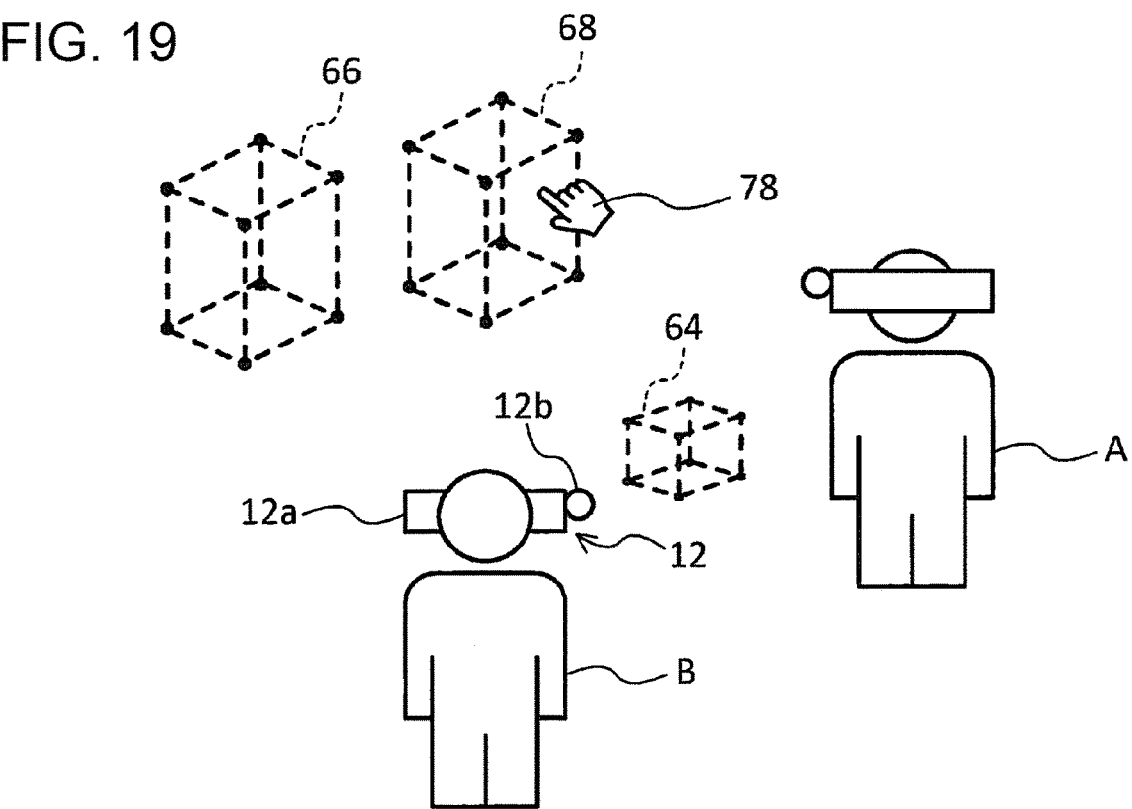
FIG. 19 is a diagram schematically illustrating users present in three-dimensional space.
Figure 20:
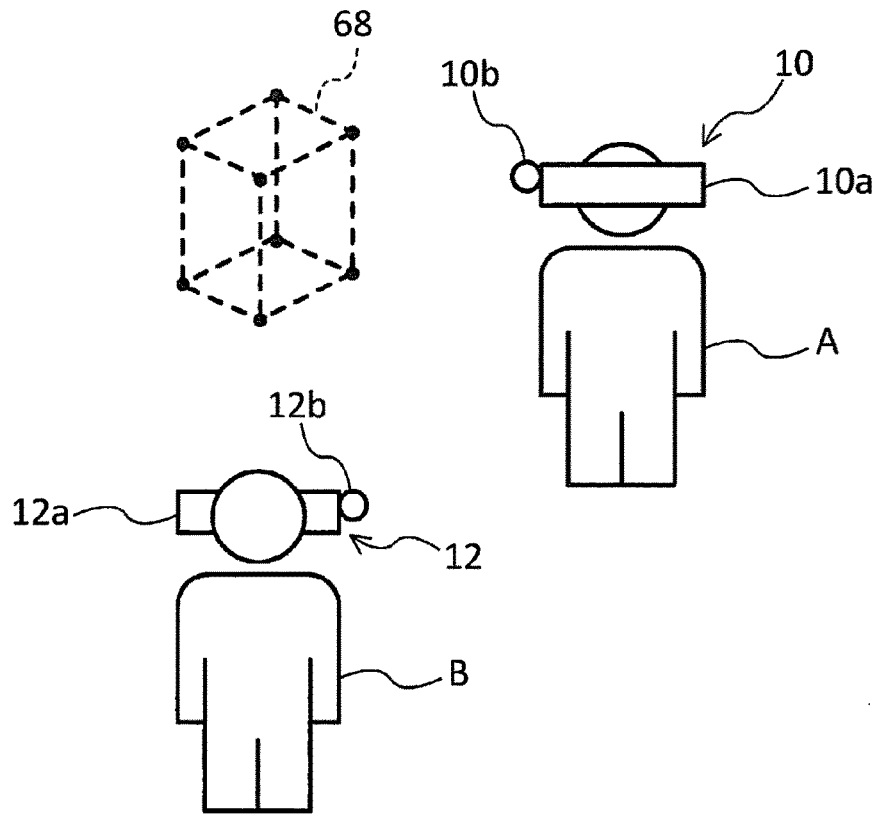
FIG. 20 is a diagram schematically illustrating users present in three-dimensional space.

With reference to FIG. 19 and FIG. 20, a specific example is used to describe an operation of selecting a shared area to be actually used. FIG. 19 illustrates the users A and B present in three-dimensional space (for example, real space or virtual space) and shared area candidates, and FIG. 20 illustrates the users A and B present in three-dimensional space and a shared area. Here, the users A and B present in real space are illustrated.

The areas 64, 66, and 68 illustrated in FIG. 19 are shared area candidates. As indicated by a reference numeral 78, in a case where any of the users A and B specifies the area 68 by, for example, gesture, speech, or an operation of their terminal apparatus as a shared area to be actually used, the selector 30 sets the selected area 68 as a shared area to be shared by the users A and B. Accordingly, a virtual object in the area 68, which is the shared area, is shared by the users A and B. That is, a virtual object in the area 68 is superimposed on real space and virtually displayed on the display screens of the display device 10*a* and the display device 12*a*. The users A and B are allowed to, for example, view and edit the virtual object by, for example, gesture, speech, or an operation of their terminal apparatuses.

The shape of a shared area and the shape of a shared area candidate may be changed by a user operation. For example, the display controller 28 changes the shape of a shared area or a candidate that is a change target in accordance with, for example, gesture, speech, or an operation of a terminal apparatus.

The display controller 28 may change the size of a shared area in accordance with a virtual object that is displayed in the shared area. In the example illustrated in FIG. 20, the display controller 28 may change the size of the area 68 in accordance with a virtual object that is displayed in the area 68. For example, as the number of pages of a document that is a virtual object increases, the display controller 28 enlarges the area 68. As the number of images that are virtual objects increases, the display controller 28 enlarges the area 68. The display controller 28 may change the size of the area 68 in accordance with the display size of a virtual object. For example, as the display size of a virtual object increases, the display controller 28 enlarges the area 68. The display controller 28 may display a guide so that a shared area having a size corresponding to a virtual object is formed or may display a guide for urging a user to move to a position at which such a shared area is formed.

After a shared area to be shared by a plurality of users has been set, an individual shared area that is an area to be shared by some of the plurality of users may be set. An individual shared area is an area that is shared only by the some of the users, and is not shared by users other than the some of the users. For example, the display controller 28 superimposes on real space and virtually displays images representing respective users joining a service (for example, a meeting) provided by the information processing system on the display screen of the display device of the AR glass of each user. An image representing a user is, for example, a photograph of the user or an image schematically representing the user (for example, an icon or an avatar).

Figure 21:
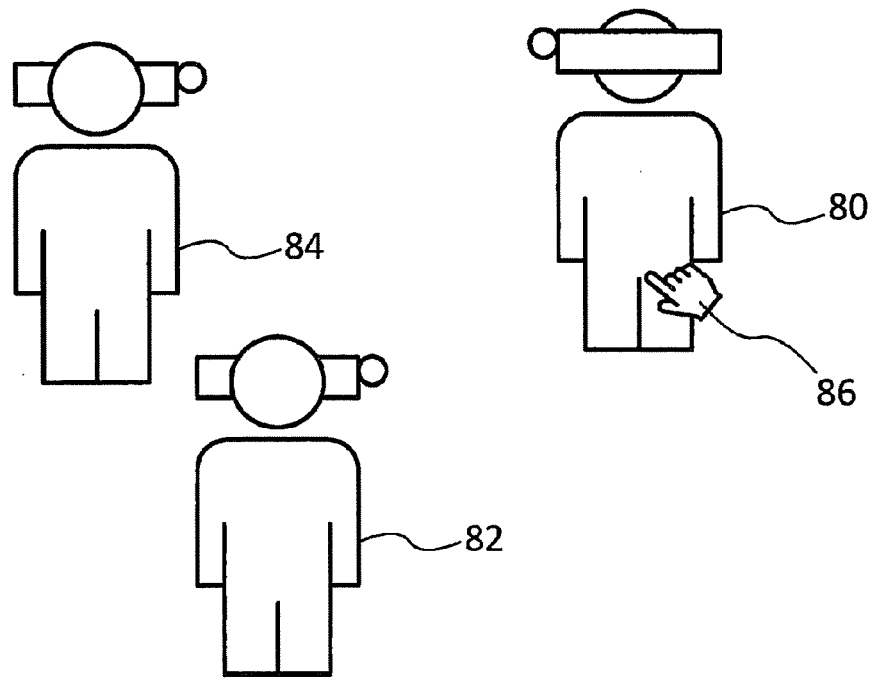
FIG. 21 is a diagram illustrating images of users.

FIG. 21 illustrates images representing users. FIG. 21 is a diagram illustrating images superimposed on real space and virtually displayed. It is assumed here that the users A, B, and C are logged in to the information processing system and are joining a service (for example, a meeting) provided by the information processing system. An image 80 is an image schematically representing the user A, an image 82 is an image schematically representing the user B, and an image 84 is an image schematically representing the user C. The images 80, 82, and 84 are superimposed on real space and virtually displayed on the display screens of the display devices of the AR glasses of the users A, B, and C. The same applies to the case where MR technology is used. In the case where VR technology is used, images of respective users are displayed in virtual space.

For example, when a user joining a service specifies an image representing a user, the mode of the information processing system transitions to an individual shared area setting mode that is a mode for setting an individual shared area. In the individual shared area setting mode, a function of setting an individual shared area to be shared by the user specifying the image and the user represented by the specified image is executed. For example, when the processing according to the flowchart illustrated in FIG. 6 is performed, individual shared area candidates are determined. The display controller 28 superimposes on real space and virtually displays the individual shared area candidates on the display screen of the display device of the AR glass of the user specifying the image and the display screen of the display device of the AR glass of the specified user.

It is assumed that, for example, the image 80 of the user A is specified by the user B as indicated by a reference numeral 86. The image 80 is specified by, for example, gesture, speech, or an operation of the user B's terminal apparatus. In this case, when performing the processing according to the flowchart illustrated in FIG. 6, the information processing apparatus 14 determines individual shared area candidates to be shared by the user B specifying the image 80 and the specified user A. The display controller 28 superimposes on real space and virtually displays the individual shared area candidates on the display screens of the display device 10*a* and the display device 12*a*.

When an individual shared area to be actually used is selected from among the individual shared area candidates by any of the users A and B, the selected individual shared area is shared by the users A and B. The individual shared area is shared only by the users A and B and is not shared by the user C. Therefore, a virtual object in the individual shared area is presented for, for example, viewing only by the users A and B, and the user C is not allowed to, for example, view a virtual object in the individual shared area.

Figure 22:
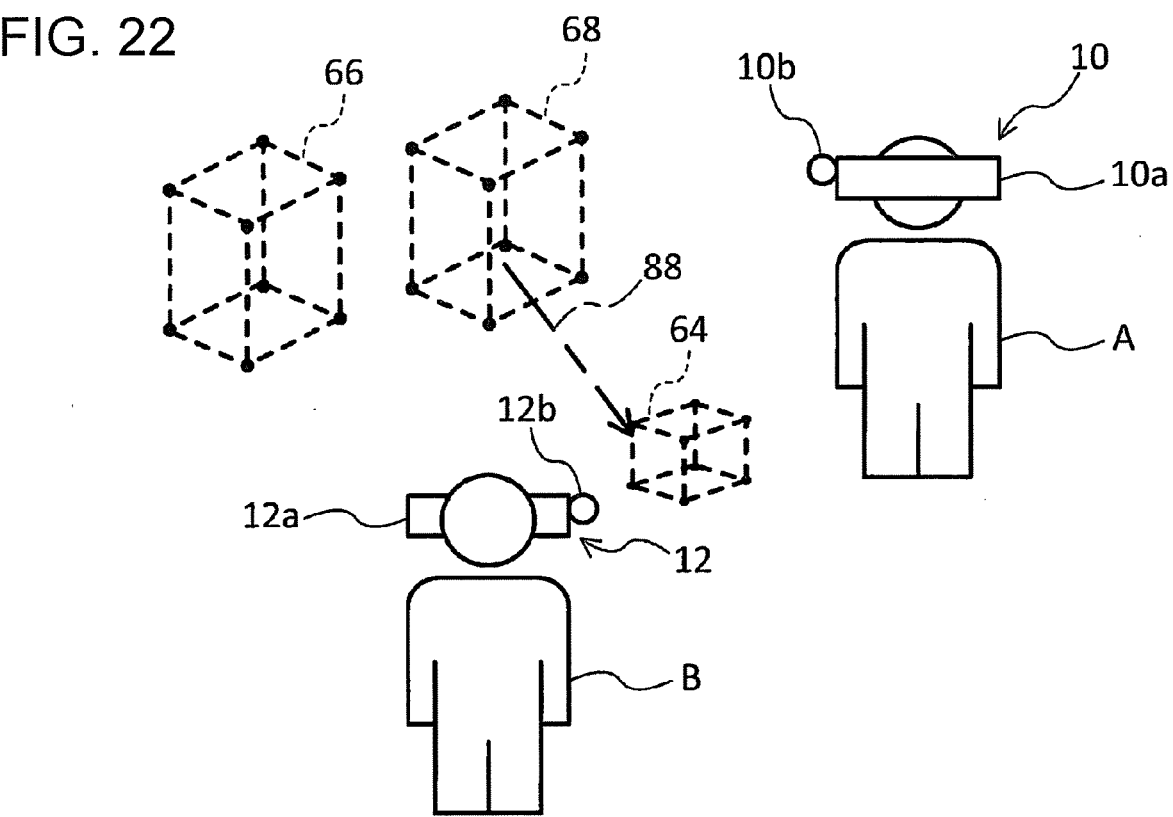
FIG. 22 is a diagram schematically illustrating users present in three-dimensional space.

The display controller 28 may display in an individual shared area, a virtual object in a shared area in accordance with a user operation of sharing the individual shared area. This process is described with reference to FIG. 22. FIG. 22 illustrates the users A and B present in real space and shared areas. It is assumed here that the areas 66 and 68 are shared areas shared by the users A, B, and C and that the area 64 is an individual shared area shared by the users A and B. That is, the users A and B are allowed to, for example, view a virtual object in the area 64, which is an individual shared area, but the user C is not allowed to, for example, view a virtual object in the area 64. The users A, B, and C are allowed to, for example, view virtual objects in the areas 66 and 68.

For example, when the user A moves a virtual object α displayed in the area 68, which is a shared area, to the area 64, which is an individual shared area, by, for example, gesture, speech, or an operation of the user A's terminal apparatus as indicated by a reference numeral 88, the display controller 28 displays the virtual object α in the area 64. The display controller 28 need not display the moved virtual object α in the area 68 from which the virtual object α is moved or may leave the virtual object α displayed in the area 68. Accordingly, in the area 64 to which the virtual object α is moved, the virtual object α is shared only by the users A and B and is not shared by the user C. A virtual object displayed in the area 64 may be displayed in the area 68, which is a shared area, in accordance with an operation by a user who shares the individual shared area. When a user is to move the virtual object α that is being displayed in the area 68, which is a shared area, the mode of the information processing system may transition to the individual shared area setting mode to select a user with which the virtual object α is to be individually shared and to set an individual shared area.

In the above-described exemplary embodiment, AR technology or MR technology is used to virtually display shared areas and candidates in real space. As another example, VR technology may be used to display shared areas and candidates in virtual space. Virtual space is three-dimensional virtual space that is contrasted with real space. For example, the coordinate system of real space and the coordinate system of virtual space correspond to each other on a one-to-one basis.

For example, VR glasses that are terminal apparatuses of eyewear type employing VR technology or HMDs employing VR technology are used. A VR glass or an HMD is worn by a user, and a shared area and a virtual object present in virtual space are displayed on the display screen of the VR glass or HMD.

Also in the case where VR technology is used, shared area candidates are determined as in the above-described exemplary embodiment.

It is assumed here that the users A and B are logged in to the information processing system and are joining a service (for example, a meeting) provided by the information processing system.

First, the processor 24 sets the positions of the users A and B in virtual space. For example, the initial position of the user A in virtual space is determined in advance, and the processor 24 sets the initial position as the position of the user A when the user A logs in to the information processing system. The same applies to the user B. As another example, the user A may specify the position of the user A in virtual space by, for example, gesture, speech, or an operation of the user A's terminal apparatus. In this case, the processor 24 sets the position specified by the user A as the position of the user A. The same applies to the user B. As yet another example, the processor 24 may set the position of the user A in virtual space on the basis of the position of the user A present in real space. For example, the coordinate system of real space and the coordinate system of virtual space correspond to each other on a one-to-one basis, and the processor 24 sets the position of the user A present in real space as the position of the user A in virtual space. The same applies to the user B.

When the positions of the users A and B in virtual space have been set, the display controller 28 displays shared area candidates in virtual space. For example, as in the above-described exemplary embodiment, a shared area used in the past by the users A and B is displayed as a shared area candidate.

The calculator 26 calculates an intersection area in which the field of view of the user A and the field of view of the user B intersect in virtual space, and the display controller 28 displays the intersection area in virtual space as a shared area candidate. The orientation of the field of view of the user A in virtual space corresponds to the orientation of the VR glass or HMD worn by the user A, and the calculator 26 calculates the orientation of the field of view of the user A in virtual space on the basis of the orientation of the VR glass or HMD. The same applies to the field of view of the user B. As in the above-described exemplary embodiment, the display controller 28 may display a guide in virtual space so that an intersection area is formed in virtual space. In this case, the display controller 28 may display a guide at a position for which movements of the fields of view of the users A and B are smallest in virtual space.

As in the case where AR technology or MR technology is used, in a case where an intersection area is formed within a predetermined distance from the positions of the users A and B in virtual space, the display controller 28 may display the intersection area in virtual space as a shared area candidate.

As in the case where AR technology or MR technology is used, an individual shared area that is shared by some of the plurality of users joining a service may be set in virtual space.

As in the case where AR technology or MR technology is used, the shape of a shared area or a candidate may be changed in virtual space, or a virtual object may be moved between shared areas.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to
set in three-dimensional space in which a plurality of users are present, an intersection area that is an area in which fields of view of the plurality of users intersect as a shared area that is an area to be shared by the plurality of users,
display in three-dimensional space, in a case where the intersection area is not formed, a guide on which the plurality of users are to turn gazes thereof for forming the intersection area, and
display the guide in three-dimensional space at a position for which movements of the fields of view of the plurality of users are smallest.

2. An information processing apparatus comprising
a processor configured to
set in three-dimensional space in which a plurality of users are present, an intersection area that is an area in which fields of view of the plurality of users intersect as a shared area that is an area to be shared by the plurality of users, and
display in three-dimensional space, in a case where the intersection area is formed within a predetermined distance from positions of the plurality of users, the intersection area as a candidate for the shared area.

3. The information processing apparatus according to claim 1, wherein
the processor is configured to further
display in three-dimensional space, in a case where the intersection area is formed within a predetermined distance from positions of the plurality of users, the intersection area as a candidate for the shared area.

4. The information processing apparatus according to claim 1, wherein
the processor is configured to further
display in three-dimensional space, an area shared in the past by the plurality of users in three-dimensional space as a candidate for the shared area.

5. The information processing apparatus according to claim 1, wherein
the processor is configured to further
display, in a case where a plurality of candidates of the shared area are present and overlap in three-dimensional space, the overlapping candidates so as to switch between the overlapping candidates at predetermined time intervals.

6. The information processing apparatus according to claim 1, wherein
the processor s configured to further
set an individual shared area that is an area to be shared by some of the plurality of users in three-dimensional space.

7. The information processing apparatus according to claim 2, wherein
the processor is configured to further
set an individual shared area that is an area to be shared by some of the plurality of users in three-dimensional space.

8. The information processing apparatus according to claim 3, wherein
the processor is configured to further
set an individual shared area that is an area to be shared by some of the plurality of users in three-dimensional space.

9. The information processing apparatus according to claim 4, wherein
the processor is configured to further
set an individual shared area that is an area to be shared by some of the plurality of users in three-dimensional space.

10. The information processing apparatus according to claim 5, wherein
the processor is configured to further
set an individual shared area that is an area to be shared by some of the plurality of users in three-dimensional space.

11. The information processing apparatus according to claim 6, wherein
the processor is configured to further
display in the individual shared area in accordance with an operation of a user who shares the individual shared area, a virtual object that is displayed in the shared area in three-dimensional space.

12. The information processing apparatus according to claim 1, wherein
the processor is configured to further
change a size of the shared area in accordance with a virtual object that is displayed in the shared area.

13. A non-transitory computer readable medium storing a program causing a computer to execute a process for information processing, the process comprising
setting in three-dimensional space in which a plurality of users are present, an intersection area that is an area in which fields of view of the plurality of users intersect as a shared area that is an area to be shared by the plurality of users,
displaying in three-dimensional space, in a case where the intersection area is not formed, a guide on which the plurality of users are to turn gazes thereof for forming the intersection area, and
displaying the guide in three-dimensional space at a position for which movements of the fields of view of the plurality of users are smallest.

* * * * *